(12) United States Patent
Chen

(10) Patent No.: US 7,165,642 B1
(45) Date of Patent: Jan. 23, 2007

(54) VEHICLE CHASSIS

(75) Inventor: Min-Chang Chen, Taichung Hsien (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 0 days.

(21) Appl. No.: 11/183,771

(22) Filed: Jul. 19, 2005

(51) Int. Cl.
  *B62K 15/00* (2006.01)
(52) U.S. Cl. ..................................... 180/208
(58) Field of Classification Search ............... 180/208, 180/209, 210, 211, 212, 215, 216, 906, 908; 280/124.109
  See application file for complete search history.

(56) References Cited

U.S. PATENT DOCUMENTS 6,336,517 B1 * 1/2002 Cheng ........................ 180/208
6,439,331 B1 * 8/2002 Fan ............................ 180/208
7,059,441 B1 * 6/2006 Chen ......................... 180/208

\* cited by examiner

*Primary Examiner*—Fay M. Fleming
(74) *Attorney, Agent, or Firm*—Harness, Dickey & Pierce, P.L.C.

(57) ABSTRACT

A vehicle chassis includes: first and second chassis parts; a locking unit including a first engaging part that is pivoted to the first chassis part and that is formed with first and second engaging recesses, a second engaging part mounted on the second chassis part and formed with a tongue such that the tongue pushes the first engaging part to rotate from an unlocking position to a locking position and slides into the first recess during coupling of the first and second chassis parts; and a retaining unit including a retaining part that is pivoted to the first chassis part and that has an engaging end which extends into the second recess when the retaining part is disposed at a retaining position.

8 Claims, 6 Drawing Sheets

VEHICLE CHASSIS

BACKGROUND OF THE INVENTION

1. Field of the Invention

The invention relates to a vehicle chassis, more particularly to a detachable vehicle chassis of a vehicle.

2. Description of the Related Art

As shown in FIG. 1, a conventional vehicle includes a front chassis part 1, a rear chassis part 2, and a seat 3 mounted on a post 103 that stands upright from the front chassis part 1. The front chassis part 1 has a rear edge formed with a first toothed portion 101 and a through-hole 102 formed in the first tooth portion 101. The rear chassis part 2 has a front edge formed with a second toothed portion 201, and a locking pin 202 mounted movably on the second toothed portion 201. When the front and rear chassis parts 1, 2 are brought into engagement with each other, the first toothed portion 101 meshes with the second toothed portion 201, and the locking pin 202 is registered with and extends into the through-hole 102 so as to interlock the front and rear chassis parts 1, 2.

The aforesaid vehicle is disadvantageous in that after the front and rear chassis parts 1, 2 are coupled together, the user is required to use the locking pin 202 to manually lock the front and rear chassis parts 1, 2, which is inconvenient to conduct. Moreover, alignment of the through-hole 102 with the locking pin 202 is also inconvenient.

SUMMARY OF THE INVENTION

Therefore, the object of the present invention is to provide a vehicle chassis that can overcome the aforesaid drawbacks of the conventional vehicle chassis.

Accordingly, a vehicle chassis of this invention comprises: a coupling unit; first and second chassis parts that are coupled detachably to each other through the coupling unit when the first and second chassis parts are moved to a coupling position, and that are aligned in a longitudinal direction; a locking unit including a first engaging part that is pivoted to the first chassis part so as to be rotatable relative to the first and second chassis parts between locking and unlocking positions, that is formed with first and second engaging recesses, and that has a curved guiding face extending between the first and second recesses, a second engaging part mounted on the second chassis part and formed with a tongue such that the tongue pushes the first engaging part to rotate from the unlocking position to the locking position, and slides along the curved guiding face into the first recess during movement of the first and second chassis parts from a decoupling position to the coupling position, and a first urging member for restoring the first engaging part from the locking position to the unlocking position; and a retaining unit including a retaining part that is pivoted to the first chassis part so as to be rotatable relative to the first and second chassis parts between retaining and releasing positions, and that has an engaging end, and a second urging member for restoring the retaining part from the releasing position to the retaining position. The engaging end of the retaining part extends into the second recess in the first engaging part when the retaining part is disposed at the retaining position, thereby retaining the first engaging part at the locking position. The engaging end of the retaining part is disengaged from the second recess when the retaining part is disposed at the releasing position, thereby permitting rotation of the first engaging part from the locking position to the unlocking position.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
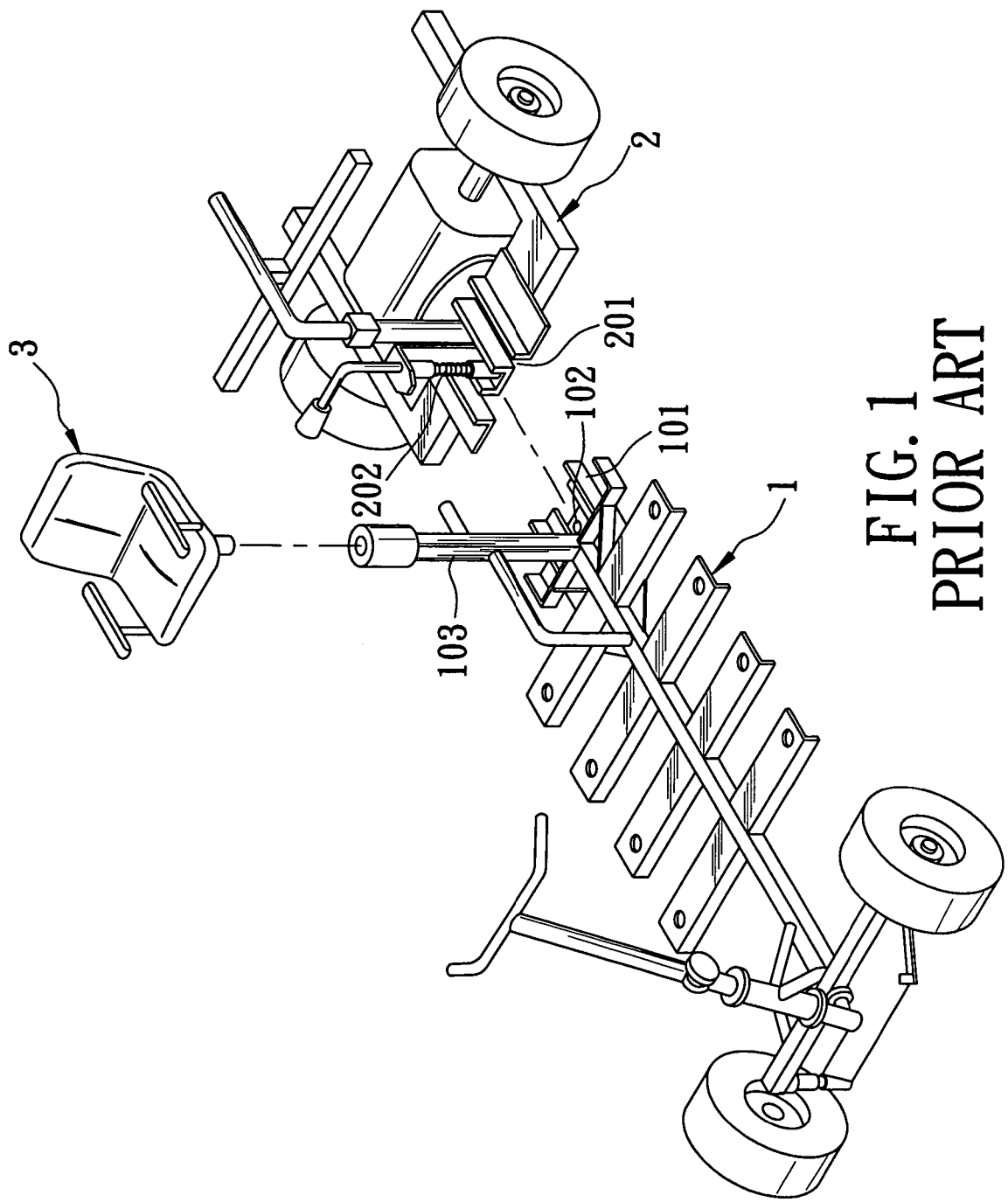
FIG. 1 is a partly exploded perspective view of a conventional vehicle.
Figure 2:
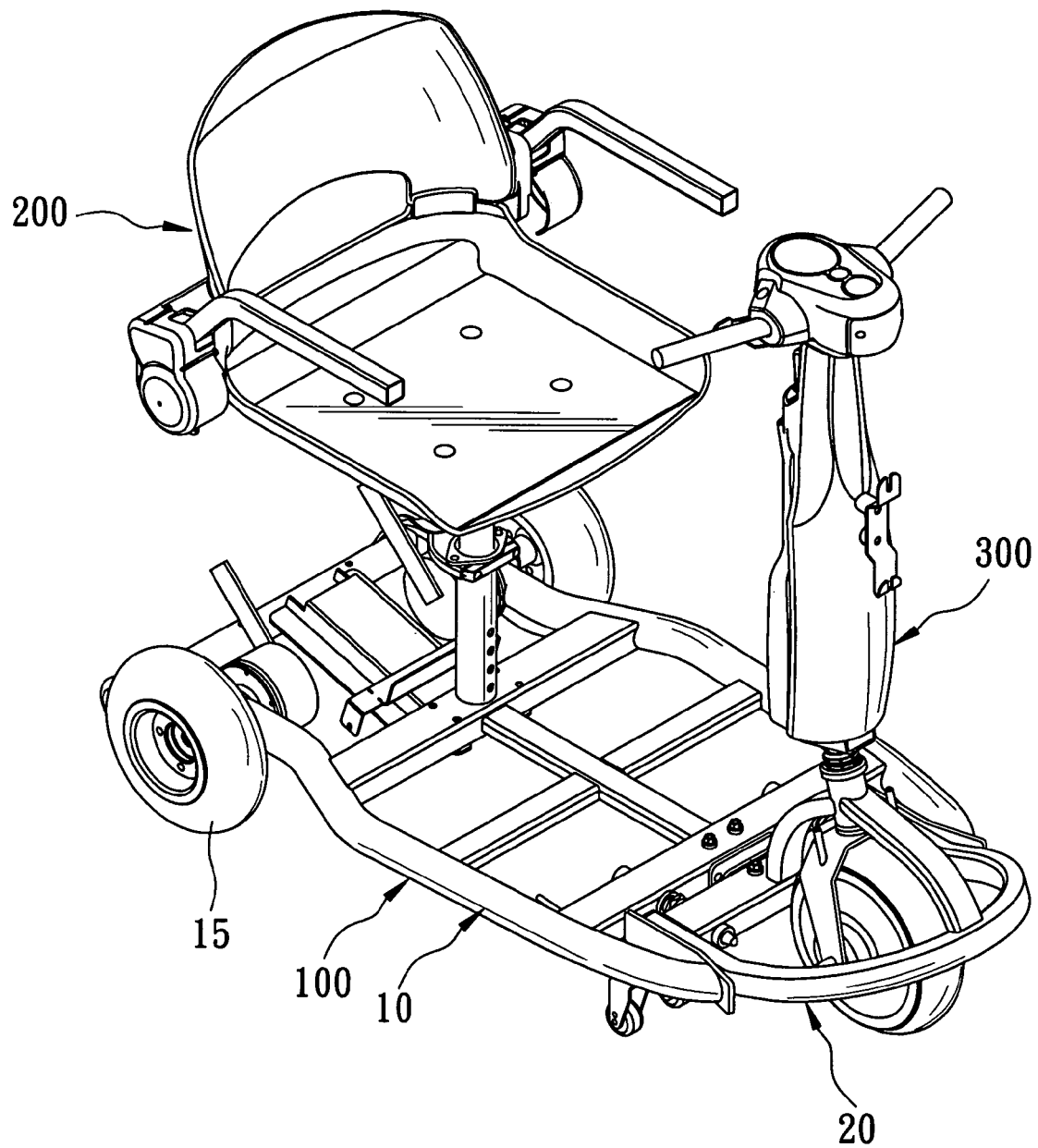
FIG. 2 is an assembled perspective view of a vehicle that incorporates the preferred embodiment of a vehicle chassis according to the present invention.
Figure 3:
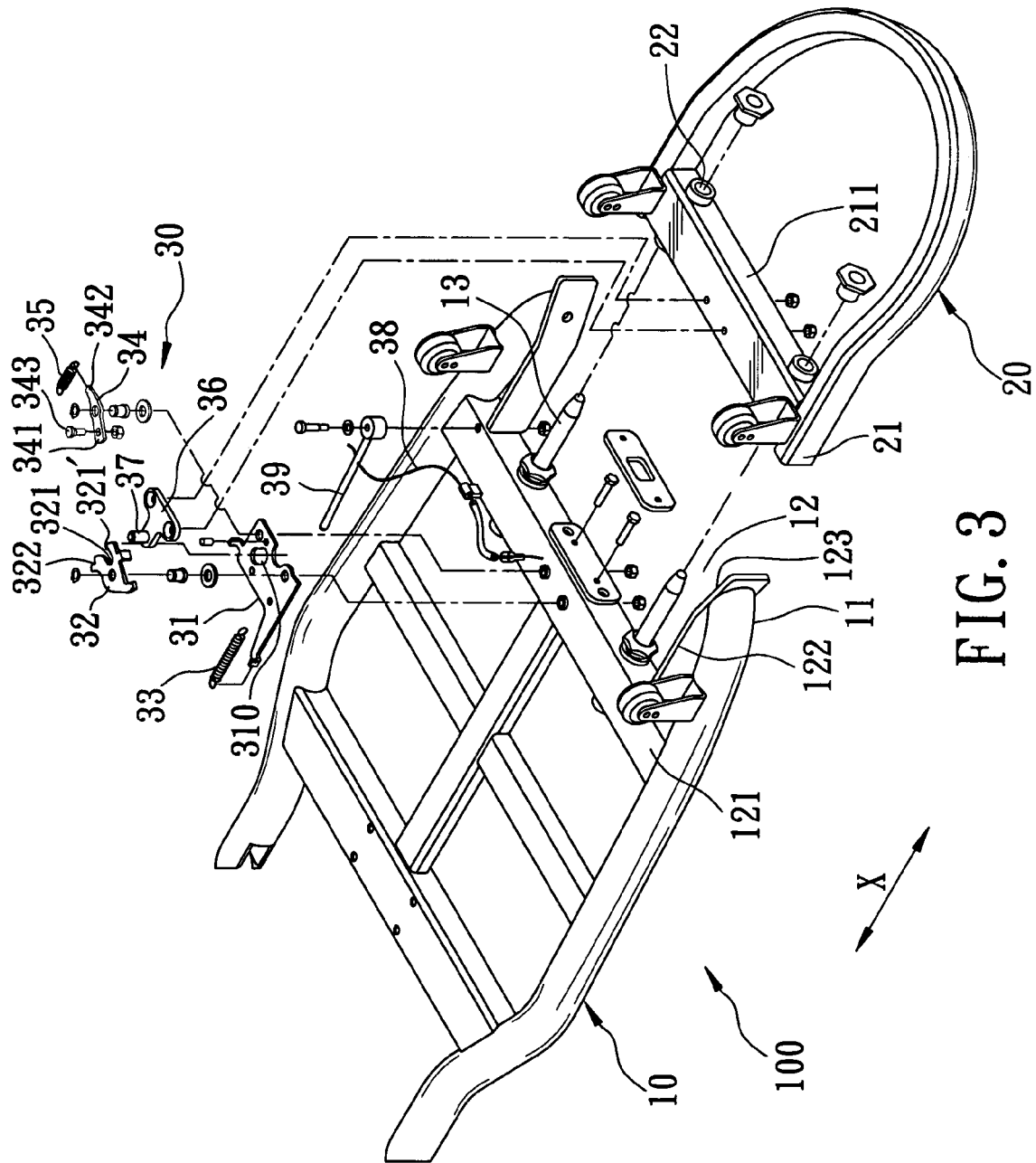
FIG. 3 is an exploded perspective view of the preferred embodiment.
Figure 4:
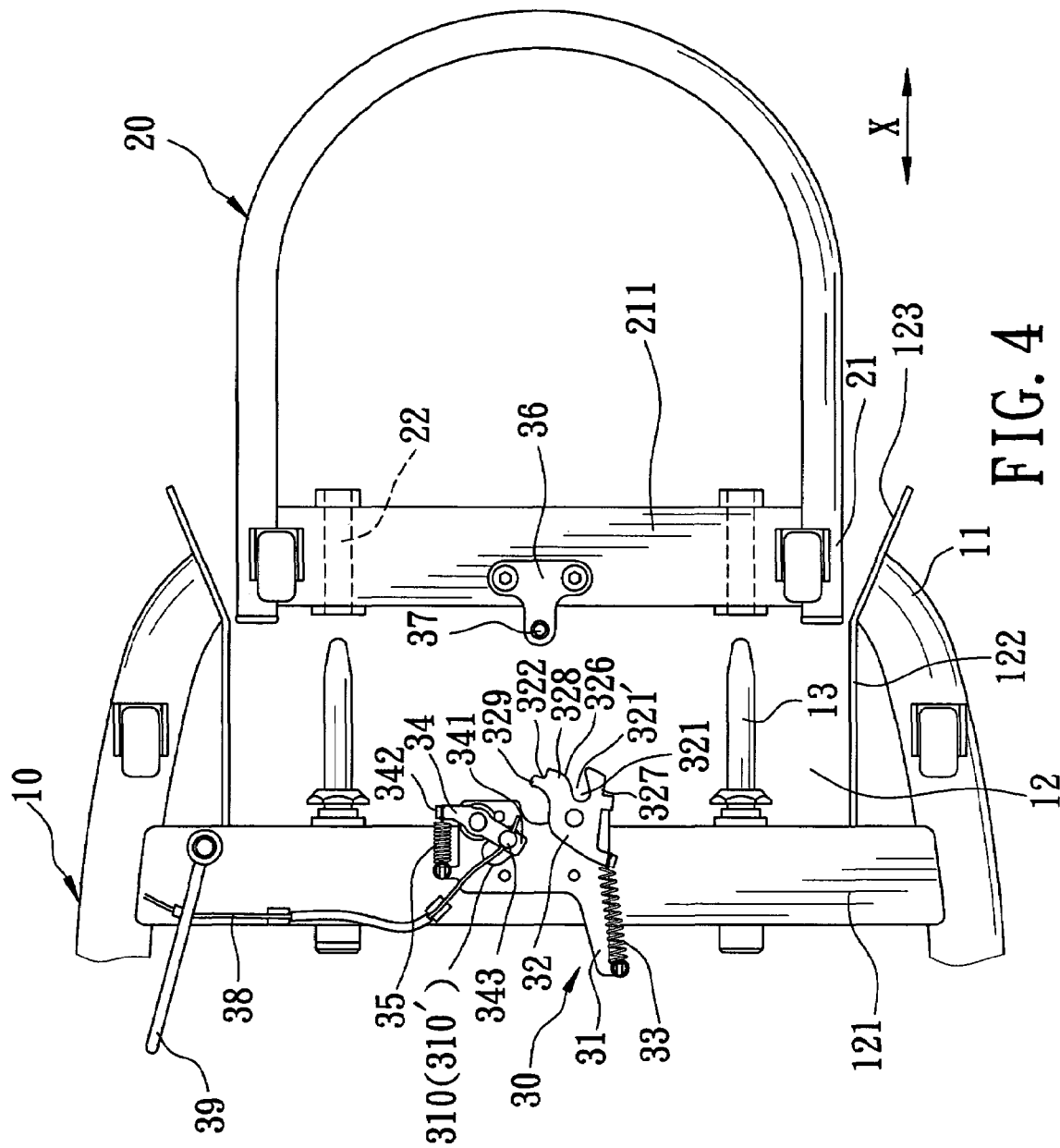
FIG. 4 is a fragmentary schematic view to illustrate how first and second chassis parts of the preferred embodiment are coupled to each other.

FIG. 2 illustrates a vehicle that incorporates the preferred embodiment of a vehicle chassis 100 according to the present invention. The vehicle further includes a seat unit 200 and a head tube unit 300. Referring to FIGS. 3 and 4, the vehicle chassis 100 includes a coupling unit, first and second chassis parts 10, 20, a locking unit 30, and a retaining unit.

The first and second chassis parts 10, 20 are coupled detachably to each other through the coupling unit when the first and second chassis parts 10, 20 are moved to a coupling position, and are aligned in a longitudinal direction (X).

The first chassis part 10 includes a frame body 11 defining a frame recess 12, and a first crossbar 121 disposed transversely relative to the longitudinal direction (X) and confining a rear side of the frame recess 12. A mounting plate 31 is mounted on the frame body 11, and is formed with an arcuate slot 310 defined by a slot-defining wall 310' which has two opposite ends. The second chassis part 20 has a connecting end 21 that is received in the frame recess 12, and includes a second crossbar 211 disposed at the connecting end 21.

The coupling unit includes two insert rods 13 that are provided on the first crossbar 121 of the first chassis part 10, and two through-holes 22 that are formed in the second crossbar 211 of the second chassis part 20 for extension of the insert rods 13 therethrough, respectively.

The first chassis part 10 further includes a pair of guiding plates 122 that are disposed in the frame recess 12 and that have free end portions 123 extending outwardly of the frame recess 12 in a diverging manner for guiding movement of the connecting end 21 of the second chassis part 20 into the frame recess 12 during movement of the first and second chassis parts 10, 20 to the coupling position.

The locking unit 30 includes a first engaging part 32, a second engaging part 36, and a first urging member 33.

The first engaging part 32 is mounted pivotally on the mounting plate 31 of the first chassis part 10 so as to be rotatable relative to the first and second chassis parts 10, 20 between locking and unlocking positions. The first engaging part 32 includes a U-shaped portion that has first and second arms 327, 328 cooperatively defining a first recess 321 therebetween. The first recess 321 has an open end 321' that opens in a transverse direction relative to the longitudinal direction (X) when the first engaging part 32 is disposed at the locking position (see FIG. 5), and that opens in the longitudinal direction (X) when the first engaging part 32 is disposed at the unlocking position (see FIGS. 4 and 6). The first engaging part 32 further includes a protrusion 329 extending from the second arm 328 and cooperating with the second arm 328 to define a second recess 322 therebetween, and a curved guiding face 326 extending between the first and second recesses 321, 322.

Figure 5:
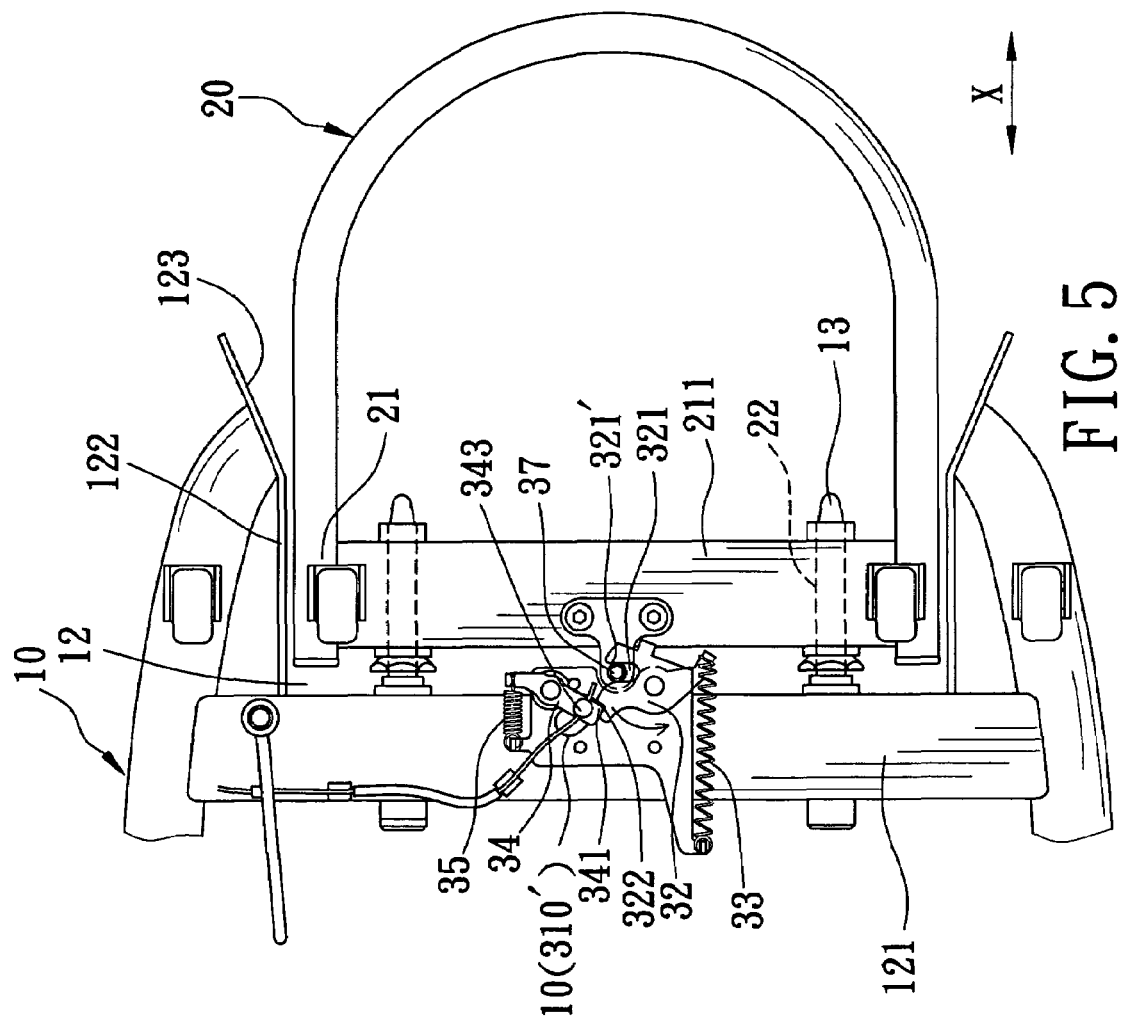
FIG. 5 is a fragmentary schematic view to illustrate a locking position of a first engaging part and a retaining position of a retaining part of the preferred embodiment.

The second engaging part 36 is mounted on the second chassis part 20, and is formed with a tongue 37 such that the tongue 37 pushes the first engaging part 32 to rotate from the unlocking position to the locking position, and slides along the curved guiding face 326 into the first recess 321 during relative movement of the first and second chassis parts 10, 20 in the longitudinal direction (X) from a decoupling position (see FIG. 6) to the coupling position (see FIG. 5).

The first urging member 33 is a coil spring connected to the first engaging part 32 and the mounting plate 31, and serves to restore the first engaging part 32 from the locking position to the unlocking position.

The retaining unit includes a retaining part 34 and a second urging member 35.

The retaining part 34 is mounted pivotally on the mounting plate 31 of the first chassis part 10 so as to be rotatable relative to the first and second chassis parts 10, 20 between retaining and releasing positions, and has an engaging end 341 and a biasing end 342 opposite to the engaging end 341. The retaining unit further includes a bolt 343 that extends through the engaging end 341 of the retaining part 34 and into the arcuate slot 310, that abuts against one of the ends of the slot-defining wall 310' when the retaining part 34 is disposed at the retaining position (see FIG. 5), and that abuts against the other of the ends of the slot-defining wall 310' when the retaining part 34 is disposed at the releasing position (see FIG. 6).

The second urging member 35 is a coil spring connected to the biasing end 342 of the retaining part 34 and the mounting plate 31, and serves to restore the retaining part 34 from the releasing position to the retaining position.

The vehicle chassis 100 further includes an actuating wire 38 connected to the engaging end 341 of the retaining part 34, and an actuation lever 39 that is pivotally mounted on the first chassis part 10 and that is connected to the actuating wire 38 for driving rotation of the retaining part 34 from the retaining position to the releasing position.

As shown in FIG. 4, when the first chassis part 10 is spaced apart from the second chassis part 20, the first engaging part 32 is biased by the first urging member 33 so as to be disposed at the unlocking position, where the open end 321' of the first recess 321 opens in the longitudinal direction (X). The retaining part 34 is biased by the second urging member 35 so as to be disposed at the retaining position. At this moment, the second recess 322 is spaced apart from the engaging end 341 of the retaining part 34.

During movement of the first and second chassis parts 10, 20 to the coupling position, as shown in FIG. 5, the connecting end 21 of the second chassis part 20 is first moved into the frame recess 12 through guidance of the guiding plates 122 and extension of the insert rods 13 into the through holes 22. As the second crossbar 211 moves close to the first crossbar 121, the tongue 37 is received in the open end 321' of the first recess 321 and pushes the first engaging part 32 such that the first engaging part 32 is rotated toward the locking position and then fully slides into the second recess 322 when the first engaging part 32 reaches the locking position. At this moment, the open end 321' of the first recess 321 faces in the transverse direction, and the first urging member 33 is extended and thus stores a force that can be used to restore the first engaging part 32 from the locking position to the unlocking position.

Figure 6:
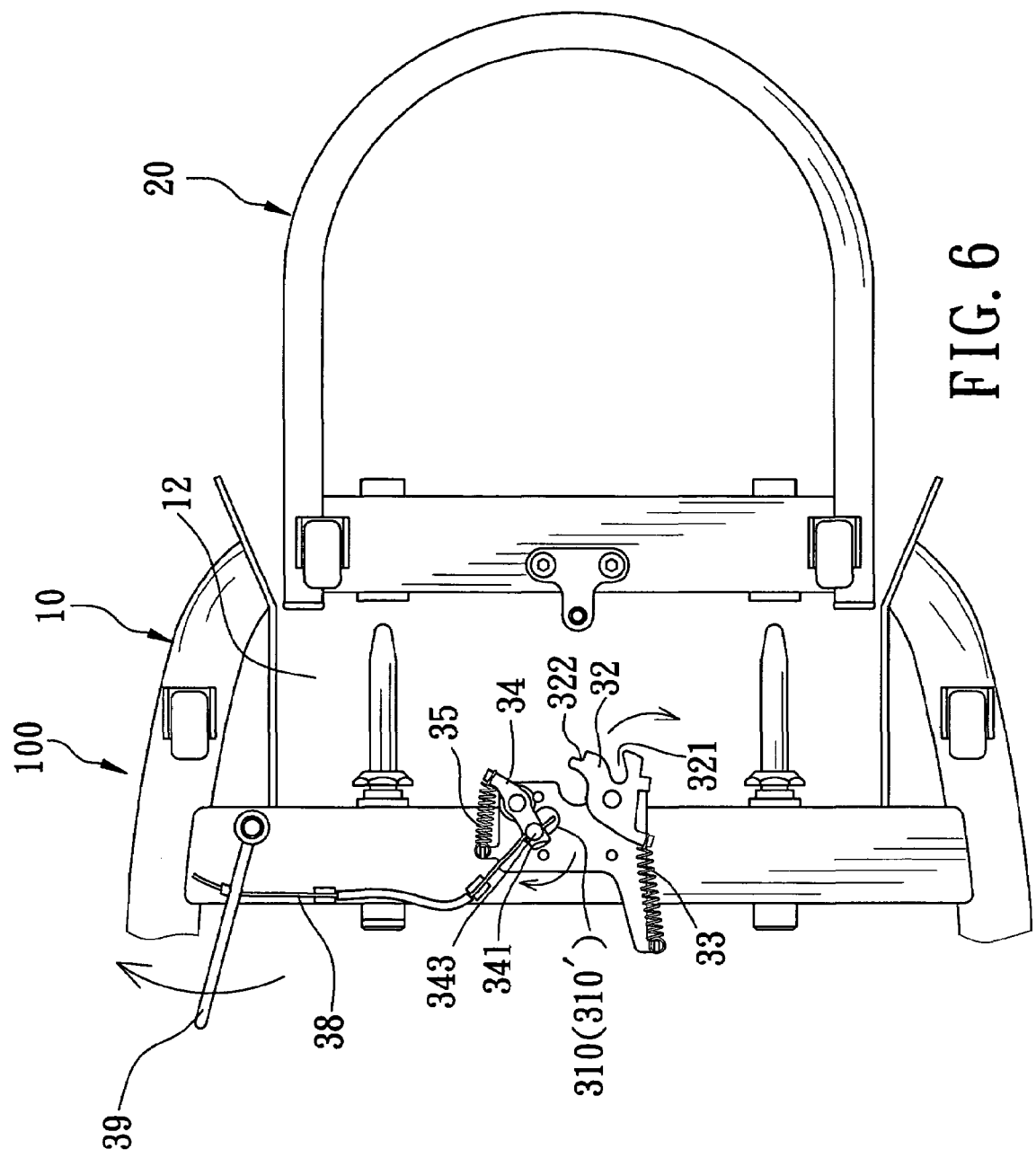
FIG. 6 is a fragmentary schematic view to illustrate how the first engaging part is moved to an unlocking position and how the retaining part is moved to a releasing position using a lever of the preferred embodiment.

As shown in FIG. 6, to decouple the first and second chassis parts 10, 20, the actuation lever 39 is pulled against the biasing force of the second urging member 35 so as to drive rotation of the retaining part 34 from the retaining position to the releasing position through the actuating wire 38 (at the same time, the second urging member 35 stores a biasing force to restore the retaining part 34 from the releasing position to the retaining position), thereby disengaging the engaging end 341 of the retaining part 34 from the second recess 322. Then, by virtue of the biasing force of the first urging member 33, the first engaging part 32 is permitted to be moved from the locking position to the unlocking position when the second chassis part 20 is moved away from the first chassis part 10 upon application of an external force.

It is apparent from the foregoing that, with the inclusion of the locking unit 30 in the vehicle chassis 100 of this invention, the first and second chassis parts 10, 20 can be easily assembled and disassembled.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A vehicle chassis comprising:
a coupling unit;
first and second chassis parts that are coupled detachably to each other through said coupling unit when said first and second chassis parts are moved to a coupling position, and that are aligned in a longitudinal direction;
a locking unit including
a first engaging part that is pivoted to said first chassis part so as to be rotatable relative to said first and second chassis parts between locking and unlocking positions, that is formed with first and second engaging recesses, and that has a curved guiding face extending between said first and second recesses,
a second engaging part mounted on said second chassis part and formed with a tongue such that said tongue pushes said first engaging part to rotate from said unlocking position to said locking position, and slides along said curved guiding face into said first recess during movement of said first and second chassis parts from a decoupling position to said coupling position, and
a first urging member for restoring said first engaging part from said locking position to said unlocking position; and
a retaining unit including
a retaining part that is pivoted to said first chassis part so as to be rotatable relative to said first and second chassis parts between retaining and releasing positions, and that has an engaging end, and
a second urging member for restoring said retaining part from said releasing position to said retaining position;

wherein said engaging end of said retaining part extends into said second recess in said first engaging part when said retaining part is disposed at said retaining position, thereby retaining said first engaging part at said locking position; and wherein said engaging end of said retaining part is disengaged from said second recess when said retaining part is disposed at said releasing position, thereby permitting rotation of said first engaging part from said locking position to said unlocking position.

2. The vehicle chassis as claimed in claim 1, wherein said first engaging part has a U-shaped portion that defines said first recess and an open end which opens in a transverse direction relative to said longitudinal direction when said first engaging part is disposed at said locking position, and which opens in said longitudinal direction when said first engaging part is disposed at said unlocking position.

3. The vehicle chassis as claimed in claim 2, wherein said first engaging part includes first and second arms that cooperatively define said first recess, said first engaging part further including a protrusion that extends from said second arm and that cooperates with said second arm to define said second recess, said engaging end of said retaining part sliding over said protrusion and extending into said second recess during rotation of said first engaging part from said unlocking position to said locking position.

4. The vehicle chassis as claimed in claim 1, wherein said first chassis part includes a mounting plate that is formed with an arcuate slot defined by a slot-defining wall which has two opposite ends, said first engaging part and said retaining part being mounted on said mounting plate, said retaining unit further including a bolt that extends through said engaging end of said retaining part and into said arcuate slot, said bolt abutting against one of said ends of said slot-defining wall when said retaining unit is disposed at said retaining position, and abutting against the other of said ends of said slot-defining wall when said retaining unit is disposed at said releasing position.

5. The vehicle chassis as claimed in claim 4, wherein said coupling unit includes two insert rods that are provided on said first chassis part, and two through-holes that are formed in said second chassis part for extension of said insert rods therethrough, respectively.

6. The vehicle chassis as claimed in claim 5, wherein said first chassis part includes a frame body defining a frame recess, said mounting plate being mounted on said frame body, said insert rods extending into said frame recess, said second chassis part including a connecting end that is received in said frame recess, said through-holes being formed in said connecting end of said second chassis part.

7. The vehicle chassis as claimed in claim 6, wherein said first chassis part further includes a pair of guiding plates that are disposed in said frame recess and that extend outwardly of said frame recess in a diverging manner for guiding movement of said connecting end of said second chassis part into said frame recess during coupling of said first and second chassis parts.

8. The vehicle chassis as claimed in claim 1, further comprising an actuating wire connected to said engaging end of said retaining part, and an actuation lever pivotably mounted on said first chassis part and connected to said actuating wire for driving rotation of said retaining unit from said retaining position to said releasing position.

* * * * *